S. M. DICK.
ARTIFICIAL BUTTER.
APPLICATION FILED MAR. 15, 1917.
1,258,997.
Patented Mar. 12, 1918.
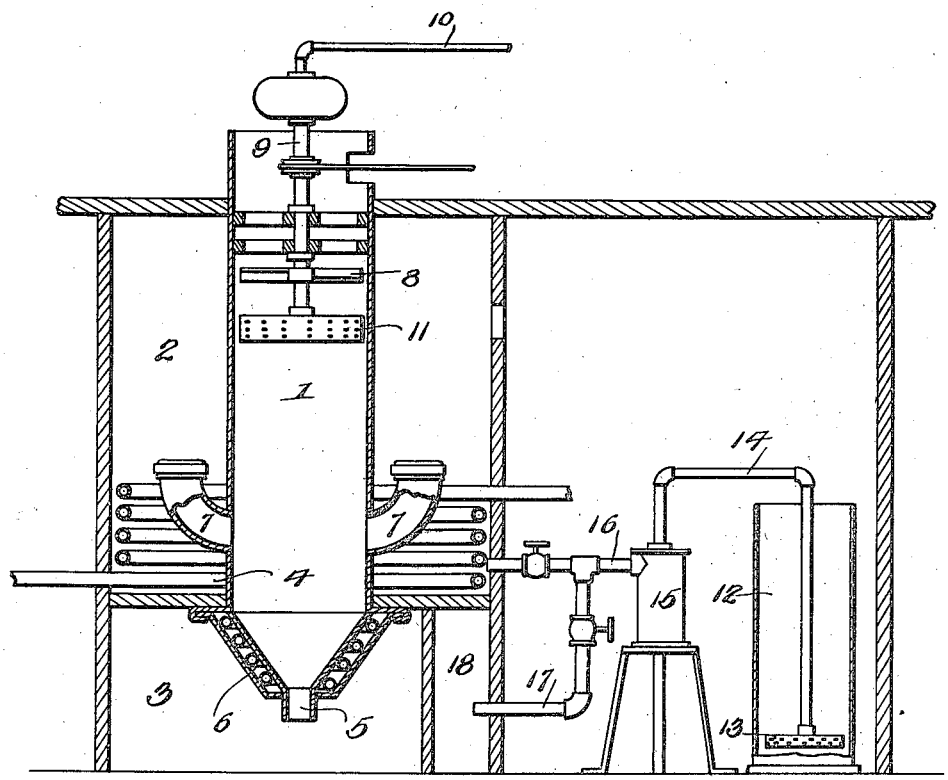
Witness
O. R. Pierce
Inventor
S. M. Dick
By H. B. Willson & Co.
Attorneys

UNITED STATES PATENT OFFICE.

SAMUEL M. DICK, OF MINNEAPOLIS, MINNESOTA, ASSIGNOR OF ONE-HALF TO FRANCIS E. MICK, OF MINNEAPOLIS, MINNESOTA.

ARTIFICIAL BUTTER.

1,258,997. Specification of Letters Patent. Patented Mar. 12, 1918.

Application filed March 15, 1917. Serial No. 154,998.

*To all whom it may concern:*

Be it known that I, SAMUEL M. DICK, a citizen of the United States, residing at Minneapolis, in the county of Hennepin and State of Minnesota, have invented certain new and useful Improvements in Artificial Butter; and I do declare the following to be a full, clear, and exact description of the invention, such as will enable others skilled in the art to which it appertains to make and use the same.

My invention has for its object to provide a substitute for butter which will in appearance and taste be equal to the best grades of pure creamery butter now commonly used, yet due to the nature of the invention, a large percentage of the solids which are thrown away in the usual buttermilk, are retained in the complete product, thus effecting a great saving.

In the manufacture of the improved dairy product, the apparatus shown in the accompanying drawing is preferably used. In this drawing, the numeral 1 designates a vertically disposed tubular casing extending through a hot air chamber 2 into a workroom 3, said chamber being heated by a hot water or steam coil 4 or by any other preferred means. The lower end of the casing 1 is funnel-shaped and is provided with an outlet 5, said end having a cooling coil 6 through which cold water, ammonia or the like is circulated. Hot air inlets 7 open from the chamber 2 into the casing 1 and a fan 8 is provided in the upper end of this casing for drawing a current of hot air through the latter from said inlets, said fan being mounted on a rotating hollow shaft 9 having an inlet pipe 10 at its upper end and a centrifugal atomizer 11 on its lower end. The atomizer serves to break up the liquid fed to the apparatus through the hollow shaft 9, and the hot air currents induced by the fan 8, carry off the required amount of moisture so that the condensed product flows into the lower end of the casing 1, said product being here cooled and more or less solidified by the coil 6, before it is discharged through the outlet 5.

On the exterior of the chamber 2 and room 3, or at any other preferred location, is a receptacle 12 having in its lower end an air spraying device 13 supplied with air at any temperature by a pipe 14 leading to a pump 15. A valved hot air inlet pipe 16 leads to the pump from the hot air chamber 2 while another valved pipe 17 leads to said pump from a refrigerator or cold air chamber 18, by preference located in the workroom 3.

As above suggested, the apparatus described is preferably employed, but other suitable constructions could well be used in the manufacture of the product.

In the manufacture of the compound around which the present application is drawn, all of the cream is separated from pure sweet milk and the sweet skimmed milk is then condensed by passage through the apparatus. The condensed sweet milk is then mixed with the sweet cream in any required proportions and the mixture is solidified to a convenient consistency for use as a substitute for butter.

In solidifying the mixed cream and condensed milk, it is preferably passed through the apparatus and then placed in the container 12 through which streams of air at any suitable temperature are directed from the spraying device 13.

The final product preferably contains about forty-five per cent. of butter fat, thirty-five per cent. of skimmed milk solids and twenty per cent. moisture. This compound is of a delicious flavor, keeps well, may be packed as expeditiously as ordinary butter and presents the same appearance as a high grade of butter. It is to be understood, however, that the proportions of butter fat, skimmed milk solids and moisture may be varied at will but I do not in most cases contemplate the use of less than twenty per cent. skimmed milk solids, since otherwise no great saving would be effected in the manufacture and use of the improved product over the usual butter.

I claim:

1. A dairy product composed of condensed sweet skimmed milk and sweet cream mixed in required proportions and solidified to a convenient consistency for use as a substitute for butter.

2. A butter substitute composed of a butter like mass of condensed cream and condensed milk.

3. A butter substitute composed of a concentrate of a mixture of cream and condensed skimmed milk, produced by spraying the mixture into heated air.

In testimony whereof I have hereunto set my hand in the presence of two subscribing witnesses.

SAMUEL M. DICK.

Witnesses:
S. M. HABERMAN,
C. A. GIOVANNETTI.